US011334686B2

(12) United States Patent
Anderson et al.

(10) Patent No.: US 11,334,686 B2
(45) Date of Patent: *May 17, 2022

(54) COMPREHENSIVE SYSTEM WIDE CROSS-REFERENCE MECHANISM USING RUNTIME DATA COLLECTION

(71) Applicant: International Business Machines Corporation, Armonk, NY (US)

(72) Inventors: Mark J. Anderson, Oronoco, MN (US); Scott Forstie, Rochester, MN (US); Jeffrey M. Uehling, Saint Charles, MO (US)

(73) Assignee: International Business Machines Corporation, Armonk, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 16/701,483

(22) Filed: Dec. 3, 2019

(65) Prior Publication Data

US 2020/0104532 A1 Apr. 2, 2020

Related U.S. Application Data

(63) Continuation of application No. 15/498,244, filed on Apr. 26, 2017, now Pat. No. 10,540,523.

(51) Int. Cl.
*G06F 21/00* (2013.01)
*G06F 21/62* (2013.01)
*G06F 16/13* (2019.01)

(52) U.S. Cl.
CPC .......... *G06F 21/6281* (2013.01); *G06F 16/13* (2019.01)

(58) Field of Classification Search
None
See application file for complete search history.

(56) References Cited

U.S. PATENT DOCUMENTS

| 6,138,238 | A | * | 10/2000 | Scheitler | G06F 21/6281 710/200 |
| 6,322,163 | B1 | | 11/2001 | Siegel | |
| 6,332,163 | B1 | * | 12/2001 | Bowman-Amuah | H04L 12/4604 719/329 |
| 6,615,253 | B1 | * | 9/2003 | Bowman-Amuah | G06F 16/9574 709/219 |
| 6,820,080 | B2 | ‡ | 11/2004 | Anderson | G06F 17/3051 707/702 |
| 8,250,666 | B2 | * | 8/2012 | Karabulut | G06F 21/52 719/329 |

(Continued)

OTHER PUBLICATIONS

Chrimes, Dillon et al. Interactive Healthcare Big Data Analytics Platform under Simulated Performance. 2016 DASC/PiCom/DataCom/CyberSciTech. https://ieeexplore.ieee.org/stamp/stamp.jsp?tp=&arnumber=7588938 (Year: 2016).*

(Continued)

*Primary Examiner* — Jeremiah L Avery
(74) *Attorney, Agent, or Firm* — Patterson + Sheridan, LLP

(57) ABSTRACT

Techniques for computer security are provided. A request to access a first file referenced as a variable in a source code of an application is received. A file name of the first file is then retrieved from a runtime stack, and the file name is stored in a system-wide accessible cross-reference file.

20 Claims, 7 Drawing Sheets

(56) References Cited

U.S. PATENT DOCUMENTS

| | | | | |
|---|---|---|---|---|
| 2002/0049603 | A1* | 4/2002 | Mehra | G06F 9/4488 726/3 |
| 2002/0049788 | A1* | 4/2002 | Lipkin | G06F 16/972 715/236 |
| 2002/0073236 | A1* | 6/2002 | Helgeson | G06F 16/258 709/217 |
| 2003/0058277 | A1* | 3/2003 | Bowman-Amuah | G06F 16/289 715/765 |
| 2003/0126136 | A1* | 7/2003 | Omoigui | H04L 29/06 |
| 2012/0102114 | A1* | 4/2012 | Dunn | G06F 3/04842 709/204 |
| 2012/0297485 | A1‡ | 11/2012 | Maeda | G06F 21/52 726/23 |
| 2014/0181792 | A1* | 6/2014 | Fanning | G06F 8/10 717/124 |
| 2015/0052149 | A1‡ | 2/2015 | Hiestermann | G01C 21/32 707/74 |
| 2016/0321068 | A1‡ | 11/2016 | Di Litta | G06F 8/71 |
| 2016/0344604 | A1‡ | 11/2016 | Raleigh | H04L 43/0876 |
| 2016/0381420 | A1‡ | 12/2016 | Blohowiak | H04N 21/4532 725/46 |
| 2018/0314843 | A1 | 11/2018 | Anderson et al. | |

OTHER PUBLICATIONS

Johnson, B. et al. A quick tools strategy for program analysis and software maintenance. Proceedings Conference on Software Maintenance 1992. https://ieeexplore.ieee.org/stamp/stamp.jsp?tp=&arnumber=242541 (Year: 1992).*

IBM, IBM Systems—iSeries for IBM i5/OS—Program Management APIs, Feb. 2006, IBM Corporation, Sixth Edition (Year: 2006).‡

IBM, IBM Systems—iSeries for IBM i5/OS—Work Management APIs, Feb. 2006, IBM Corporation, Sixth Edition (Year: 2006).‡

IBM, IBM Systems—iSeries for IBM i5/OS—Files and file systems-Database file management, Feb. 2006, IBM Corporation, Sixth Edition (Year: 2006).‡

IBM, IBM Systems—iSeries for IBM i5/OS—Security-Planning and setting up system security, Feb. 2006, IBM Corporation, Sixth Edition (Year: 2006).‡

Guido, Mark D.; Brooks, Marc W. Insider Threat Program Best Practices. 2013 46th Hawaii International Conference on System Sciences. https://ieeexplore.ieee.org/stamp/stamp.jsp?tp=&arnumber=6480062 (Year: 2013).‡

Trias, Eric D. et al. Enterprise Level Security. MILCOM 2016—2016 IEEE Military Communications Conference. https://ieeexplore.ieee.org/stamp/stamp.jsp?tp=&arnumber=7795297 (Year: 2016).‡

Marriott, Damian; Sloman, Morris. Management Policy Service for Distributed Systems. Proceedings of the Third International Workshop on Services in Distributed and Networked Environments. https://ieeexplore.ieee.org/stamp/stamp.jsp?tp=&arnumber=502441 (Year: 1996).‡

Lupu, Emil C.; Sloman, Morris. Conflicts in Policy-Based Distributed Systems Management. IEEE Transactions on Software Engineering, vol. 25, Issue: 6. https://ieeexplore.ieee.org/stamp/stamp.jsp?tp=&arnumber=824414 (Year: 1999).‡

Lupu, Emil C.; Sloman, Morris. Conflicts in Policy-Based Distributed Systems Management. IEEE Transactions on Software Engineering, vol. 25, Issue: 6. https://ieeexplore.ieee.org/stamp/stamp.jsp?tp=&arnumber=824414 (Year: 1999).

Marriott, Damian; Sloman, Morris. Management Policy Service for Distributed Systems. Proceedings of the Third International Workshop on Services in Distributed and Networked Environments. https://ieeexplore.ieee.org/stamp/stamp.jsp?tp=&arnumber=502441 (Year: 1996).

Trias, Eric D. et al. Enterprise Level Security. MI LCOM 2016—2016 IEEE Military Communications Conference. https:// ieeexplore.ieee.org/stamp/stamp.jsp?tp=&arnumber=7795297 (Year: 2016).

Guido, Mark D.; Brooks, Marc W. Insider Threat Program Best Practices. 2013 46th Hawaii International Conference on System Sciences. https://ieeexplore.ieee.org/stamp/stamp.jsp?tp=&arnumber=6480062 (Year: 2013).

IBM, IBM Systems—iSeries for IBM i5/OS—Problem Management AP Is, Feb. 2006, IBM Corporation, Sixth Edition (Year: 2006 ).

IBM, IBM Systems—iSeries for IBM i5/0S—Work Management AP Is, Feb. 2006, IBM Corporation, Sixth Edition (Year: 2006).

IBM, IBM Systems—iSeries for IBM i5/0S—Files and file systems—Database file management, Feb. 2006, IBM Corporation, Sixth Edition (Year: 2006).

IBM, IBM Systems—iSeries for IBM i5/0S—Security-Planning and setting up system security, Feb. 2006, IBM Corporation, Sixth Edition (Year: 2006).

IBM, "List of IBM Patents or Patent Applications Treated As Related," for U.S. Appl. No. 16/701,483, filed Dec. 3, 2019.

* cited by examiner
‡ imported from a related application

| 301 | 302 | 303 | 304 | MOST_RECENT_ | 306 | 307 | 308 |
|---|---|---|---|---|---|---|---|
| USER_NAME | OBJECT_NAME | LIBRARY_NAME | OBJECT_TYPE | USER_PROGRAM | STATEMENT_NUMBER | MOST_RECENT_PROGRAM | STATEMENT_NUMBER |
| FRED1 | DSPPFM | QSYS | *CMD | USERPGM1 | 12 | QCARULE | 97 |
| FRED1 | CALL | QSYS | *CMD | - | - | QCARULE | 97 |
| FRED1 | SENSITIVE1 | QGPL | *FILE | USERPGM1 | 12 | QNFBROWS | 86 |
| FRED1 | SENSITIVE1 | QGPL | *FILE | USERPGM1 | 12 | QDBOPEN | 14653 |
| FRED1 | QDNFBRWS | QSYS | *FILE | USERPGM1 | 12 | QDMCOPEN | 1416 |
| FRED1 | QGPL | QSYS | *LIB | USERPGM1 | 12 | QDMCOPEN | 803 |
| FRED1 | USERPGM1 | QGPL | *PGM | - | - | QCACALL | 72 |
| FRED1 | USERPGM1 | QGPL | *PGM | USERPGM1 | 4 | QLIADOPT | 3 |

305

| 309 | 310 | 311 | 312 | 313 |
|---|---|---|---|---|
| REQUIRED_AUTHORITY | DETAILED_REQUIRED_AUTHORITY | USERS_CURRENT_AUTHORITY | DETAILED_USERS_CURRENT_AUTHORITY | AUTHORITY_SOURCE |
| *USE | *OBJOPR *READ *EXECUTE | *USE | *OBJOPR *READ *EXECUTE | PUBLIC |
| *USE | *OBJOPR *READ *EXECUTE | *USE | *OBJOPR *READ *EXECUTE | PUBLIC |
| *CHANGE | *OBJOPR | *CHANGE | *OBJOPR *READ *ADD *DLT *UPD *EXECUTE | USER PRIVATE |
| *CHANGE | *OBJOPR *READ | *CHANGE | *OBJOPR *READ *ADD *DLT *UPD *EXECUTE | USER PRIVATE |
| *CHANGE | *OBJOPR *READ *ADD *DLT *UPD *EXECUTE | *CHANGE | *OBJOPR *READ *ADD *DLT *UPD *EXECUTE | PUBLIC |
| - | *EXECUTE | *USE | *OBJOPR *READ *EXECUTE | PUBLIC |
| *USE | *OBJOPR *READ *EXECUTE | *USE | *OBJOPR *READ *EXECUTE | USER PRIVATE |
| - | *OBJOPR | *USE | *OBJOPR *READ *EXECUTE | USER PRIVATE |

FIG. 3A

| SOURCE OBJECT 350 | TARGET OBJECT 351 | USER 352 | USER PROGRAM STATEMENT NUMBER 353 | REQUIRED AUTHORITY 354 | ACTUAL AUTHORITY 355 | AUTHORITY SOURCE 356 |
|---|---|---|---|---|---|---|
| USERPGM1 | SENSITIVE1 | FRED1 | 12 | CHANGE | CHANGE | USER PRIVATE |
| USERPGM1 | DSPPFM | FRED1 | 12 | USE | USE | PUBLIC |
| USERPGM1 | QDNFBRWS | FRED1 | 12 | CHANGE | CHANGE | PUBLIC |

FIG. 3B

COMPREHENSIVE SYSTEM WIDE CROSS-REFERENCE MECHANISM USING RUNTIME DATA COLLECTION

CROSS-REFERENCE TO RELATED APPLICATIONS

This application is a continuation of co-pending U.S. patent application Ser. No. 15/498,244, filed Apr. 26, 2017. The aforementioned related patent application is herein incorporated by reference in its entirety.

BACKGROUND

The present disclosure relates to computer security, and more specifically, to providing a comprehensive, system-wide cross-reference mechanism using runtime data collection.

Cross-reference files are used to store data reflecting associations between executable objects and files and/or other executable objects in a system. For example, if a program accesses a file storing customer addresses, the cross-reference file for the system would reflect an association between the program and the file storing the customer addresses. However, conventional approaches to generating cross-reference information are incomplete, as the cross-reference information is gathered by tools that analyze source code, or created by compilers at compilation time of an application. These compilers and source code analyzers cannot produce a complete and accurate picture of the cross-reference information in a system because source code often contains program variables whose values are unknown at compilation time (e.g., when the name of a target file is defined in the code by a variable, rather than the actual name of the target file). Rather, the values of these variables are set at runtime of the application, and therefore cannot be included in the cross-reference files generated by source code analyzers and compilers.

SUMMARY

In one embodiment, a method comprises receiving a request to access a first file referenced as a variable in a source code of an application, retrieving a file name of the first file from a runtime stack, and storing the file name in a system-wide accessible cross-reference file.

In another embodiment, a computer-readable storage medium has computer-readable program code embodied therewith, the computer-readable program code executable by a processor to perform an operation comprising receiving, from an application executing on a system, a request to access a data file, wherein the data file is referenced by a variable name in a source code of the application, receiving data describing the request, wherein the data describing the request is obtained from a runtime stack of the application and includes a name of the application and a name of the data file, wherein the runtime stack resolves the systems, methods, and computer program products according to various embodiments of the pres accessed the data file in a cross-reference data store for the system.

In another embodiment, a system comprises a processor and a memory storing instructions, which when executed by the processor, performs an operation comprising receiving, from an application executing on a system, a request to access a data file, wherein the data file is referenced by a variable name in a source code of the application, receiving data describing the request, wherein the data describing the request is obtained from a runtime stack of the application and includes a name of the application and a name of the data file, wherein the name of the data file is used as a value for the variable name, and storing an indication that the application accessed the data file in a cross-reference data store for the system.

BRIEF DESCRIPTION OF THE SEVERAL VIEWS OF THE DRAWINGS

FIGS. 3A-3B illustrate techniques to generate comprehensive, system-wide cross-reference data using runtime data collection, according to various embodiments.

DETAILED DESCRIPTION

Embodiments disclosed herein build accurate, system-wide cross-reference data based on runtime data collected as programs execute in the system. Generally, embodiments disclosed herein collect detailed runtime data describing each access to an object in the system. The data describing the object access is then used to build the cross-reference data for the system. For example, a program may access at least two files, file1 and file2, during execution. However, file1 is explicitly defined in the source code of the program (e.g., an instruction/statement specifying to open "file1"), while file2 is not defined in the source code of the program. Instead, the source code may specify to open "&filename", where "&filename" is a variable name whose value (e.g., "file2") is not known until runtime. As such, conventional cross-reference techniques would not be able to include the program's access to file2. Advantageously, however, embodiments disclosed herein identify the program's access to file2 during runtime, and collect detailed information regarding the access during the program's execution. The collected information may then be used to update the system's cross-reference data to reflect that the program accessed file2.

Figure 1:
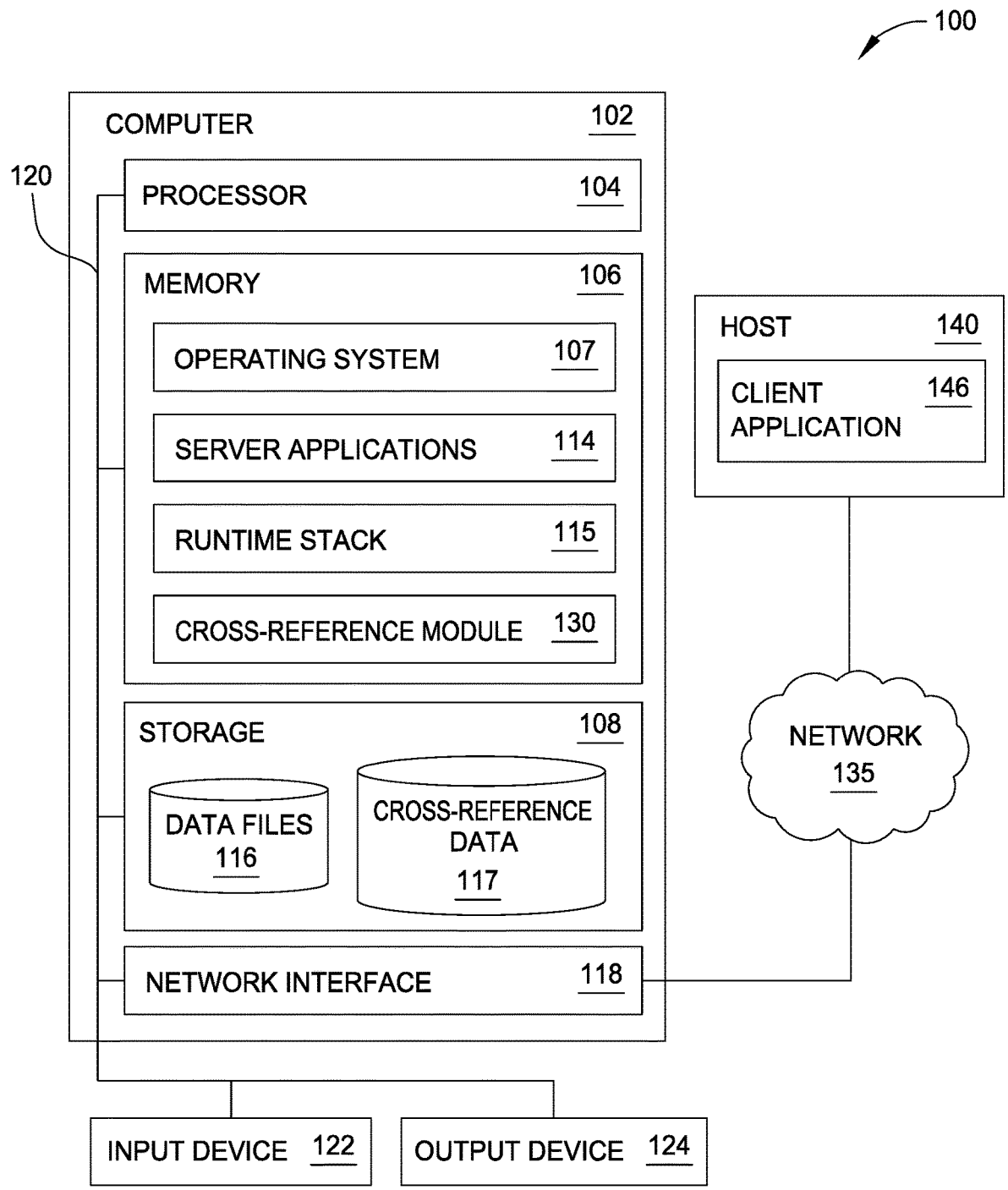
FIG. 1 illustrates an example computing environment which provides a comprehensive, system-wide cross-reference mechanism using runtime data collection, according to one embodiment.

FIG. 1 illustrates an example computing environment 100 which provides a comprehensive, system-wide cross-reference mechanism using runtime data collection, according to one embodiment. The computing environment 100 includes a computer 102. The computer 102 may also be connected to other computers (e.g. hosts) via a network 135.

The computer 102 generally includes a processor 104 which obtains instructions and data via a bus 120 from a memory 106 and/or storage 108. The computer 102 may also include one or more network interface devices 112 connected to the bus 120. The computer 102 is generally under the control of an operating system 107. Examples of operating systems include the IBM i operating system, UNIX operating system, the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The processor may execute one or more server applications 114 in memory 106. In at least one embodiment, the OS 107 allocates each program executing on the computer 102 a respective runtime stack 115. The network interface 112 may be any type of network communications device allowing the computer 102 to communicate with other computers via the network 135. The network interface 112 may exchange messages with the network 135.

The storage 108 is representative of hard-disk drives, solid state drives, flash memory devices, optical media, and the like. Storage 108 may also include structured storage, for example a database. In addition, the memory 106 and the storage 108 may be considered to include memory physically located elsewhere; for example, on another computer coupled to the computer 102 via the bus 120 or network 135.

Furthermore, the computer 102 may be one or more servers operating as a part of a server cluster. For example, computer 102 may operate as an application server and may communicate with or in conjunction with other frontend, application, backend, data repository, or other type of server.

As shown, the memory 106 further includes at least one or more runtime stacks 115 and a cross-reference module 130. Generally, a runtime stack (also referred to as a call stack) is a stack data structure that stores information about the active subroutines of a program (e.g., a server application 114), as well as calls made by the program to other programs and interfaces, such as application programming interfaces (APIs) or system calls. The cross-reference module 130 leverages data collected during execution of any object in the computer 102, such as the server applications 114, to generate accurate, system-wide cross-reference information which is stored in the cross-reference data 130. For example, if a first server application 114 opens a second server application 114 during execution, the cross-reference module cross-reference module 130 may store an indication of the relationship between the first and second server applications 114 in the cross-reference data 117.

As shown, the storage 108 includes a store of data files 116 and cross-reference data 117. The data files 116 are representative of any type of data, including, without limitation, applications (e.g., the executable files of the server applications 114), programs, scripts, files, queues, indexes, and any other type of data object or system object. The cross-reference data 117 stores relationships between the files, programs, and objects (e.g., the data files 116 and/or the server applications 114) used by a particular program (e.g., a data file 116 and/or a server application 114).

For example, the source code of a program named "program1" may include a statement such as "open &filename", where "&filename" is a variable whose value is not known until runtime. As such, conventional cross-reference systems would not reflect the association in the cross-reference data 117. However, the cross-reference module 130 may determine, based on collected runtime data, that program1 opens a file in the data files 116 named "file1", which is the value of "&filename" in the source code described above. As such, the cross-reference module 130 generates and stores an indication of the relationship between program1 and file1 in the cross-reference data 117. In at least one embodiment, the cross-reference module 130 specifies the names of program1 and file1 along with additional metadata. The additional metadata may include, without limitation, an indication of the user executing program1, a library used by program1 to access file1, a program statement number (e.g., an instruction) of program1 which makes the call to open file1, the authority required to access file1 (e.g., a set of access permissions), the actual authority settings of the user who is accessing program1, and the source of the authority (including, but not limited to, user, group and/or other/public authority) used to access file1.

Generally, each data file 116 has a respective set of access permissions. For example, in many operating systems, each file and directory has a set of permissions such as read, write, and execute permissions. Each file and directory is associated with a set of user-based permissions which control what permissions a particular user, or group of users, or applications have. For example, a particular user may have read-only permissions on one file in the data files 116 and read/write permissions on another file in the data files 116. Furthermore, an application, such as server application 114, has files not only in a dedicated directory, but may also have files in system, shared, or user directories scattered throughout a file system. As such, each application has a respective set of access permissions for accessing the data files 116. For example, a given server application 114 may have read-only access to all of the files in a first directory, but read/write access to all of the files in a second directory.

However, in some embodiments, an application, executing in the context of an executing user, derives permissions from the user-level permissions of the executing user. As such, for example, the application may use the derived permissions to open a file for read access. Furthermore, the application may be able to elevate its authority, i.e., the application may be able to assert another set of permissions other than those permission derived from the user's permissions. For example, the setuid utility in Linux, allows an application to assert the authority of the owner of the application rather than the user. By asserting the authority of an entity other than the user, the application may be able to access files that the user otherwise would not be able to access. Using this elevated authority, the application is able to open the file for read/write access even though the user does not have read/write permissions on the file.

The hosts 140 are compute nodes configured to execute one or more client applications 146. Generally, client applications 146 may be deployed in any suitable configuration. For example, client applications 146 may execute on computer 102 as a process, or within the context of a virtual machine executing on computer 102. As another example, multiple client applications 146 may execute on a single compute node, separate from computer 102. As shown, client applications 146 execute on multiple hosts 140, which are separate from computer 102. The client applications 146 may communicate, via the network 120, with the server applications 114.

Figure 2:
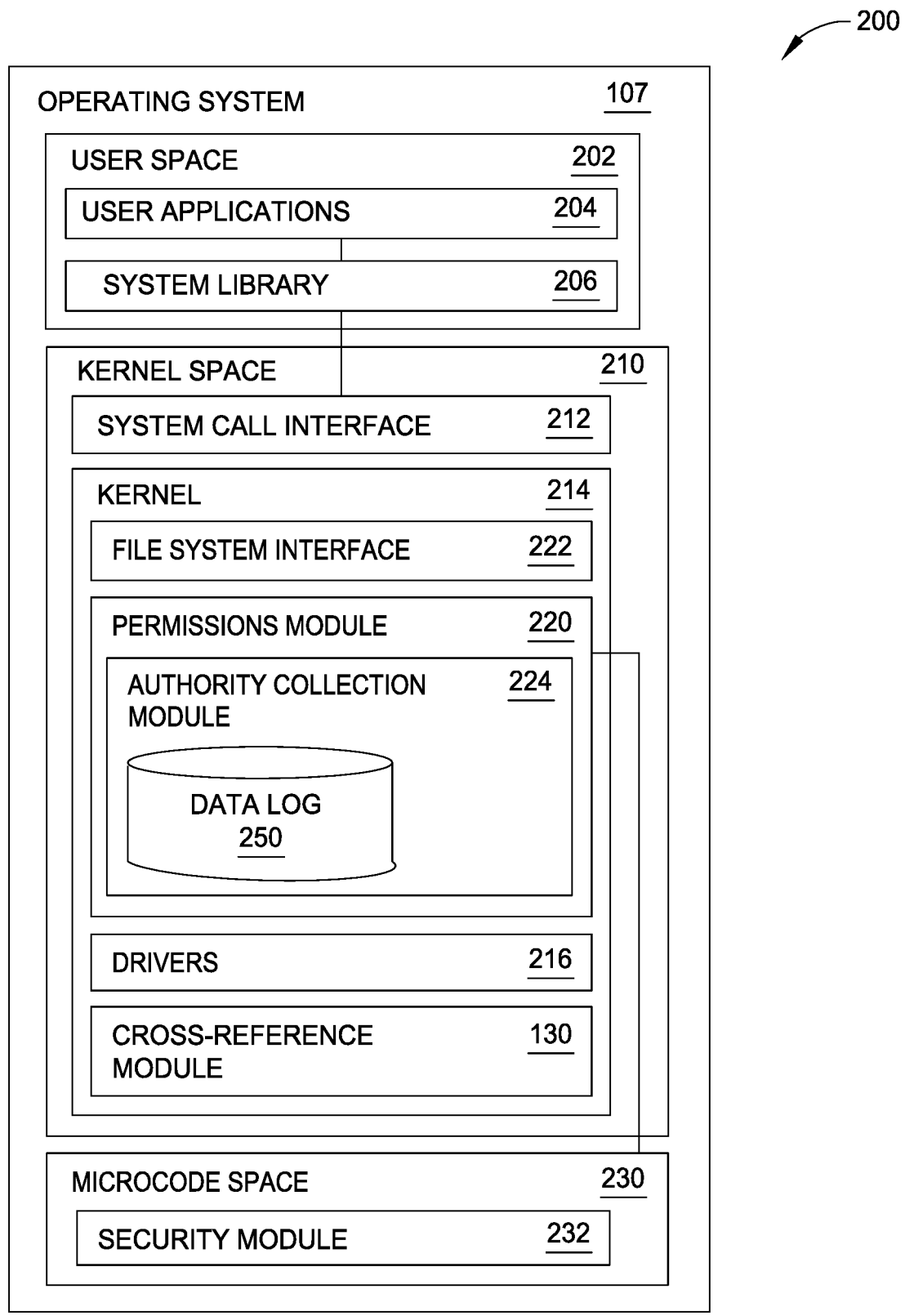
FIG. 2 illustrates components of an example operating system, according to one embodiment.

FIG. 2 illustrates components of the operating system 107, according to one embodiment. As discussed above, the computer 102 is generally under the control of the operating system 107, which acts as an intermediary between computer hardware and provides a set of common services for software applications, including server and client applications. One service provided by the operating system 107 includes security services via file permissions. A software user application 204, such as a client or server application, may execute in a user space 202 of the operating system 207. The user application 204, executing in the context of a first user, may call into a system library 206, such as an API or C library, requesting access to one or more files (e.g., in the memory 106 and/or the data files 116). The system library 206 may then make a system call to a system call interface 212. The user application 204 may also directly make system calls to the system call interface 212. The system call interface 212, executing in kernel space 210, processes the system call.

Kernel space 210 is a protected address space in memory in which core operating system operations, such as processing input/output (I/O) requests, managing memory, etc., are executed. Generally, kernel space 210 is reserved for executing an operating system kernel 214, any installed kernel extensions (not shown) and device drivers 216. In contrast, user space 202 is address space in memory (separate from kernel space 210) used to execute applications 204, a graphical user interface (GUI, not pictured), and system libraries 206. Each instance of a computer program executing in user space 202 is generally executed within its own virtual memory address space in the context of the user executing the program. Programs executing in user space 202 generally cannot access the virtual memory space of other programs without passing access requests through the kernel via the system library 206. Kernel programs executing in kernel space 210 generally have full memory access.

For example, in accessing a file, an application may invoke a system call, such as access( ) of the system library 206, passing in an indication of what type of access is sought, such as read or read/write access. The system library 206 then calls into the system call interface 212 executing in kernel space 210. The system call interface 212 may call into a permissions module 220 of the kernel 214 to determine whether the application has sufficient permissions to access the file. The permissions module 220 may base the permissions determination on, for example, the calling process' real authority based on the user authority, or the calling process' elevated authority, if available.

Generally, the kernel 214 manages access to I/O devices, including access to the file system and storage, as allowing direct application access to I/O device ports and controllers may cause system instabilities due to a misbehaving single application. As a part of managing access to the I/O device, the kernel 214 generally, determines whether to allow the application to perform file operations on the file based on the authority of the application, such as the user, group, or other authority, and the permissions on the file, and this determination may be made by the file permission check module 220 of the kernel 214. The permissions module 220 obtains the application's real or elevated authority and accesses file permissions information to perform functions necessary to verify that the application 204 has sufficient permissions to access the file.

The permissions module 220 obtains the application's real or elevated authority and accesses file permissions information to perform functions necessary to verify that the application 204 has sufficient permissions to access the file. For example, the permissions module 220 may interface with the file system interface 222 to access the file. The file system interface checks the file system and returns the file permissions. File permissions are stored with the file in a file system (e.g., new technology file system (NTFS), extended file system (ext, ext2-ext4), library based file system, database based file systems). For example, Unix style file permissions may be stored as 9 bits of information along with the file indicating which three actions (read, write, and execute) may be performed by which three groups (user, group, other). The permissions module 220 interprets these information bits to determine permissions to the file. Additionally, the file system may support access control lists (ACL) which may support assigning actions to more than one user or group for each file. ACLs are also stored in the file system.

Generally, permissions for a file in the data files 116 are checked whenever there is an action performed on the file. For example, if a file is opened for reading, the permissions module 220 performs a check to verify the user has read permissions on the file. Where the user then performs an edit on the file the application may then open the file for read/write access. If the file is then re-opened for read/write, even during the same application instance, the permissions module 220 performs another check on the file permissions. The permissions module 220 performs another permissions check when the file is actually being written to, such as during a save.

In checking the permissions on a file, the permissions module 220 obtains file permissions information. This information may be passed along to an authority collection module 224 invoked by, or contained within, the permissions module 220. This information may pertain to, for example, details of the permissions available to the user, along with permissions available to any groups or ACLs associated with the user, permissions obtained from an executable asserting elevated privileges, permissions required by the file operation API, time information, system object information, whether an authority check is successful, and other such information useful for checking whether a user has sufficient permissions to access a file. As the authority collection module 224 may collect information related to each permissions check, the authority collection module 224 may determine the permissions requested by an application, along with the permissions actually used by the application. Generally, the information collected by the authority collection module 224 includes identifying information of the requested file, the location of the file, users involved in the request (e.g., process user and groups), the authority required to access the file, what authorization list secures the file, all program adopted authority (e.g., elevated privileges), and information related to the current environment such as job names and numbers, and the like.

The authority collection module 224 may further obtain information from an application's runtime stack 115, which may detail each active subroutine of a program as well as calls by the program to other programs and interfaces, such as API or system calls. The runtime stack 115 may further include a statement number of the most recent program (or application) on the runtime stack 115, and a statement number of the most recent running user application 204 on the runtime stack 115. As such, the authority collection module 224 is able to identify the actual program statement number (e.g., an instruction) being executed which specifies to access a file in some way, and invokes the permissions module 220 to perform a permissions check. The permissions module 220 may use the information collected by the authority collection module 224 from the runtime stack 115 when performing the file permissions check. If the information gathered by the authority collection module 224 does not satisfy a rule for accessing a file, the permissions module 220 denies the request to access the file.

More generally, the authority collection module 224 is configured to obtain information related to any type of system event, such as a file permissions check, and store the collected data in the data log 250. The logging operations performed by the authority collection module 224 may be configurable. For example, the authority collection module 224 may be configured to log every request for a file permissions check as well as the results of the check for a particular user. In addition, other configurations may be supported, such as for multiple users, specific types of files, or based on specific file permissions sought. The information may be stored in the data log 250, which, in at least one embodiment, is stored in a protected block of memory. Logging, via the authority collection module 224 may be performed over a period of time, observing the files access by users in the ordinary course of activities on the computer. This logged file may be accessible, like other files, by an administrator or user to view and analyze using other tools, such as a database view tool.

Once the authority collection module 224 stores the collected data in the data log 250, the cross-reference module 130 may update the cross-reference data 117 to reflect accesses to the data files 116 by other data files 116. In at least one embodiment, however, the authority collection module 224 passes the collected data directly to the cross-reference module 130. Generally, the cross-reference module 130 ensures that redundant information is not stored in the cross-reference data 117. Therefore, if an application accesses a file once per day, the cross-reference module 130 stores a single entry reflecting the access in the cross-reference data 117, rather than creating a redundant entry in the cross-reference data 117 each time the application accesses the file. In at least one embodiment, the cross-reference module 130 executes as a background task for performance reasons. In such embodiments, the permissions module 220 calls the cross-reference module 130, and provides the data collected by the authority collection module 224 for a given access request.

As shown, a protected microcode space 230 is provided, which may be physically separate from hardware used to store and execute the user space 202 and kernel space 210. For example, the microcode space 230 may execute on a service processor or processor subsystem that interfaces with and manages another processor or other portions of a processor. The microcode space 230 provides a protected memory and execution space separate from both the user space 202 and kernel space 210 which kernel programs may call into while performing certain functions. The permissions module 220 may call into, for example, a security module 232 executing in the microcode space 230 to gather the file permissions information. Generally, authority collection of the file permissions may be performed in the same context in which file permissions are obtained. Where file permissions information is obtained in microcode, authority collection and authority adjustment may be performed, at least in part, in microcode space 230. For example, interfaces for beginning and ending authority collection and logging may be implemented in the OS kernel space 210 or user space 202, while data collection itself may be performed in microcode space 230.

According to aspects of the present disclosure, architecture of the operating system 107 and how an authority collection process is implemented influences the amount and type of information available for collection as file permission information may be treated as privileged information by the operating system 107. For example, the operating system 107 may partition execution of programs executing in user space 202 such that they cannot access information related to other programs, such as a request for a file, without cooperation between multiple programs. Where such cooperation is not available, such as between legacy or third party programs, requests for access to or from another program may be passed along to the OS 107 itself. However, some operating systems may not support user space programs obtaining information related to file access by another program without a certain level of corporation between the programs. File permissions information available to applications executing solely in user space 202 thus may be much less detailed than can be obtained where the authority collection is integrated to some degree in the OS kernel 214.

FIG. 3A is a chart view of example data collected by the authority collection module 224 and stored in the data log 250, according to one embodiment disclosed herein. More specifically, FIG. 3A depicts a portion of information collected by the authority collection module 224 of FIG. 2 based on requests for access to several files and objects. The view is based on database query on the data log 250 and contains information related to multiple files and objects. Information related to a specific file may be identified and displayed by other database queries. Here, the data log 250 includes columns of information pertaining a requesting username 301, a name of the system object placing the call 302, a name of the library making the call 303, a type of the requested object 304, a most recent user program 305 on the runtime stack 115 invoking the system call, a statement number 306 of the most recent user program 305 on the runtime stack invoking the system call, a most recent program 307 on the runtime stack 115, a statement number 308 of the most recent program on the runtime stack 115, a required authority 309 needed to access the object 302, a detailed authority 310 required to access the object 302, a current authority 311 the user 301 currently has relative to the object 302, a detailed authority 312 the user 301 has relative to the object 302, and a source 313 of the authority used to satisfy the authority check for the object 302. The statement numbers 306, 308 correspond to the numbers of machine-level code statements generated by compiling higher-level source code. Generally, the cross-reference module 130 may use any of the data stored in the data log 250 to generate cross-reference information for storage in the cross-reference data 117.

As discussed above, the authority collection module 224 gathers the information stored in the data log 250 during a system operation such as a file permission check performed by the permissions module 220. The authority collection module 224 then classifies and logs the obtained information to the data log 250. The information in the data log 250 also includes information obtained by the authority collection module 224 from the runtime stack 115 when a file permission check is requested. Again, the runtime stack 115 may contain information related to the active subroutines of the application, including names of any additional applications called, names of calling and called subroutines, statement numbers of calling and called subroutines, timestamps of calls, order in which applications are called, whether a particular called application invoked elevated authority, and other runtime execution environment information related to the application, similar to information that may be available to a debugging development environment. The authority collection module 224 may parse the runtime stack 115, classifying the information in the runtime stack 115, and storing the classified information in the data log 240.

FIG. 3B depicts example entries in the cross-reference data 117, according to one embodiment. Generally, when a program (or other executable object) in the data files 116 attempts to access another object in the data files 116 (which may be any type of object, such as another program, a script, data file, etc.), the cross-reference module 130 analyzes the data collected by the authority collection module 224, and creates an entry in the cross-reference data 117 (assuming an entry describing the relationship does not already exist). As shown, the example cross-reference data 117 depicted in FIG. 3B includes a column for a source object 350 (e.g., a program or executable in the data files 116), a target object 351 accessed by the source object 350 (e.g., another program or file in the data files 116), a user 352 executing the source object 350, a statement number of the source object 350 in which the call to access the target object 351, a required authority column 355 describing the authority permissions required to access the target object 351, an actual authority permissions 355 used by the source object 350 to access the target object 351, and an authority source 356 specifying where the source object 350 derived the actual authority permissions 355. The actual columns 350-356 are for illustrative purposes only, as the cross-reference data 117 may include any of the data collected by the authority collection module 225.

As shown, therefore, the cross-reference data 117 reflects that a program "USERPGM1" executing in the context of a user "FRED1" accesses a file "SENSITIVE1" in program statement number 12. The authority required to access "SENSITIVE1" is "CHANGE", while the actual authority used by "USERPGM1" is "CHANGE", and is derived from a user private authority source. In at least one embodiment, the access to "SENSITIVE1" is not available at compilation time, as a variable is used in the source code of "USERPGM1", rather than the name "SENSITIVE1". Advantageously, however, the cross-reference module 130 is able to capture the cross-reference relationship and store an indication in the cross-reference data 117.

Figure 4:
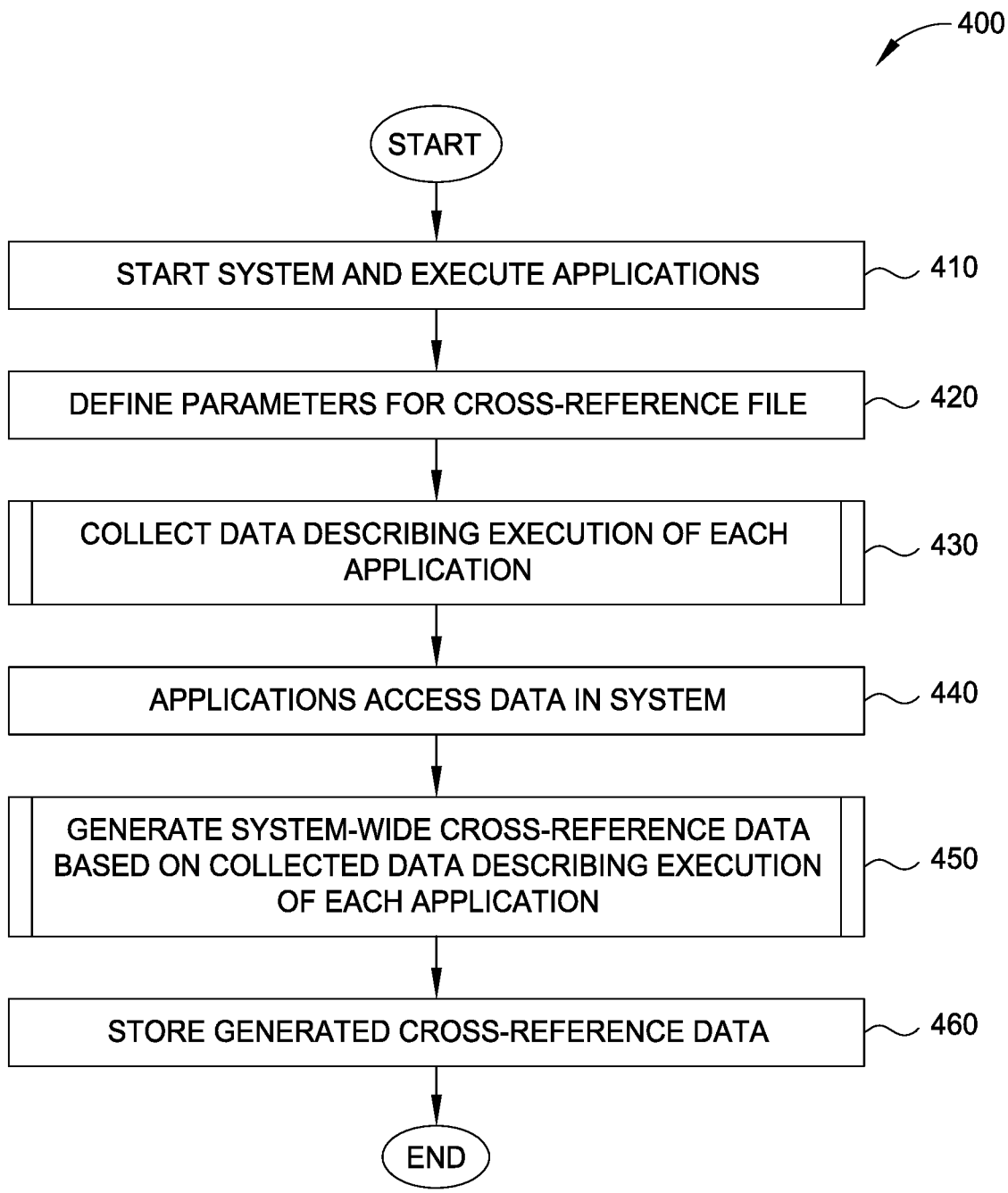
FIG. 4 is a flow chart illustrating an example method to generate comprehensive, system-wide cross-reference data using runtime data collection, according to one embodiment.

FIG. 4 is a flow chart illustrating an example method 400 to generate comprehensive, system-wide cross-reference data using runtime data collection, according to one embodiment. As shown, the method 400 begins at block 410, where a system such as the computer 102 is started and applications such as the server applications 114 begin executing. At block 420, parameters for the cross-reference data 117 are defined. The parameters may generally specify the types of data that are included in data records stored in the cross-reference data 117. For example, some system administrators would prefer to include basic levels of data (e.g., the names of the source and target objects), while other system administrators would include more detailed information, such as the statement number, authority information, and the like.

At block 430, described in greater detail with reference to FIG. 5, the authority collection module 224 continuously collects data describing the execution of each of the applications. For example, the collected data may include data describing at least one access to a data file 116 (e.g., a file, application, object, etc.) by the applications executing on the system. Generally, at block 430, the authority collection module 224 collects at least the types of parameters depicted in FIG. 3A, and stores the data in the data log 250. In at least one embodiment, the authority collection module 224 and/or the permissions module 220 provide the collected data directly to the cross-reference module 130.

At block 440, at least one application executing on the system accesses at least one other data file 116 on the system. For example, a program may access a spreadsheet, receive data from the spreadsheet, and invoke a different program which generates a report based on the spreadsheet data. Generally, the access is initiated by the program code of the application via an instruction that specifies to access the other data file. At block 450, described in greater detail with reference to FIG. 6, the cross-reference module 130 generates system-wide cross-reference data based on the data collected by the authority collection module 224. Generally, at block 450, the cross-reference module 130 creates cross-reference data 117 that reflects each access between objects on the system. At block 460, the cross-reference module 130 stores the cross-reference data generated at block 450 in the cross-reference data 117.

Figure 5:
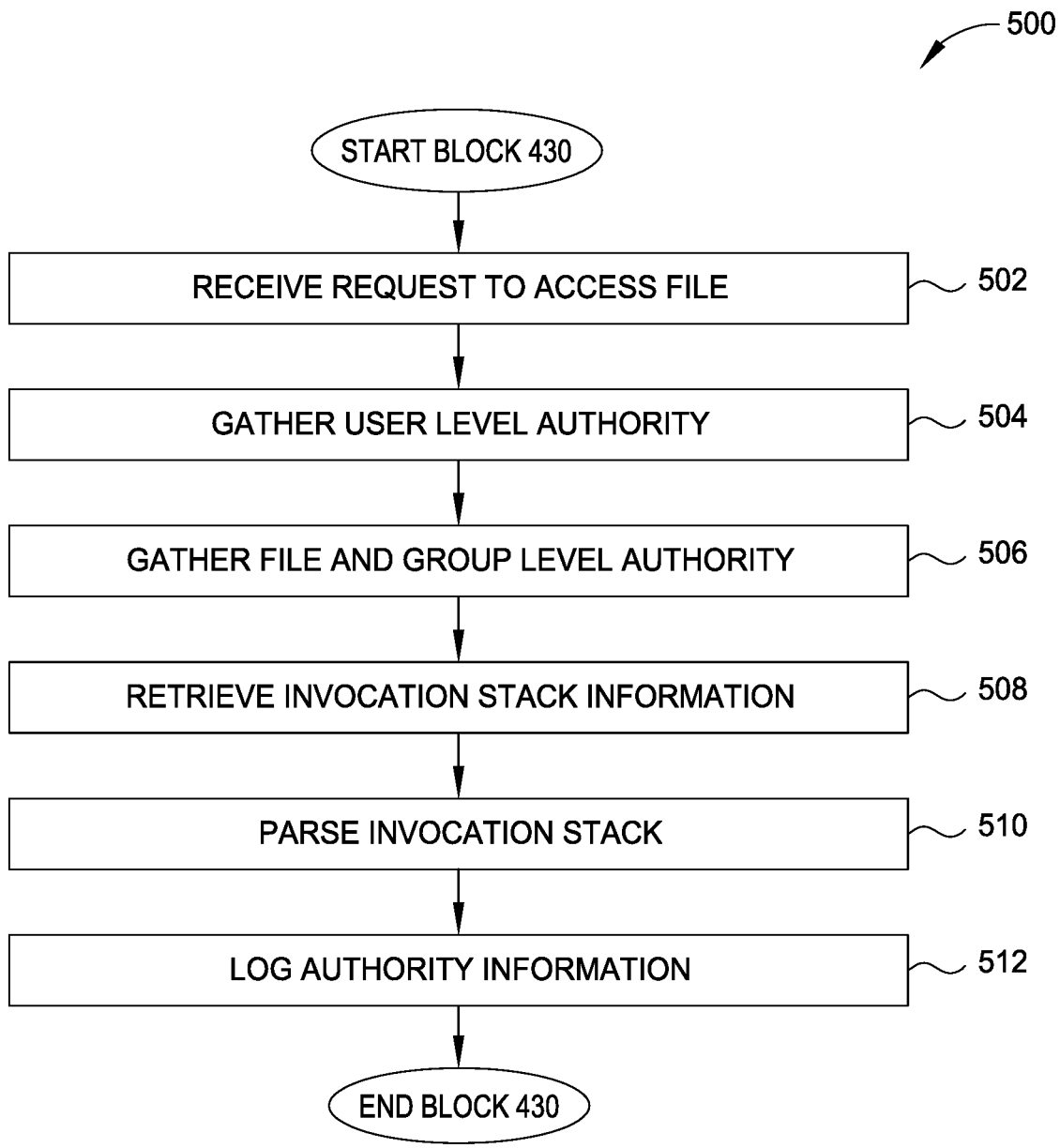
FIG. 5 is a flow chart illustrating an example method to collect data describing application execution, according to one embodiment.

FIG. 5 is a flow chart illustrating an example method 500 corresponding to block 430 to collect data describing application execution, according to one embodiment. As shown, the method begins at block 502 when an application requests access to a file. In response, the authority collection module 224, via the file permissions check module 220, receives an indication of the identity of the file, the location of the file, the type of access requested (e.g., read/write/execute) along with user level identity information, such the process user and groups to which the process user is a member of. This user level identity information and permissions associated with the identity may be gathered by the authority collection module 224 at block 504 for a particular file and file location. The file permissions check module 220 may also obtain permissions information related to the file, such as the authority required by the system to access the file, users and groups current authority to the file, and ACL lists for the file. This file and group permissions information may be gathered by the authority collection module 224 at block 506 for a particular file and file location.

At block 508, the authority collection module 224 retrieves a runtime stack 115 of the application requesting access to the file as well as information related to the runtime execution environment, such as job names, IDs, etc. Retrieving the runtime stack 115 enables access to detailed information related the execution environment as well as information related to the application requesting access to the file. For example, the runtime stack may contain detailed information related to the runtime execution environment, such as information related to active calls made by the application, including names of any additional applications called, names of calling and called subroutines, statement numbers of calling and called subroutines, order in which applications are called, whether a particular called application invoked elevated authority, thread information, job information, and other runtime execution environment information related to the application. At block 510, the authority collection module 224 parses the runtime stack 115, identifying, for example, programs on the runtime stack 115, program statement numbers invoked at each level of the runtime stack, system object call, job and thread information for the runtime environment. The parsing may, for example, be performed by looking at variable information passed into the system call, along with information related to returning to the subroutine when processing a particular call is finished, as well as environment information from a runtime context for the call.

The authority collection 224 module may also determine whether elevated privileges were asserted and if so, what privileges those elevated privileges comprise. This determination may be based on, for example, the runtime stack 115, or by monitoring for privilege elevation requests. For example, the runtime stack 115 may contain runtime execution environment information indicating what authority a particular application is invoking when the particular application makes a call to another application, a system call, or for each call. The authority collection module 224 may gather identification information related to the executable asserting elevated privileges, including name and location of the executable, module, procedure name, and statement number within the executable requesting access to the file, and an indication as to whether the elevated privileges are used to access the file. At block 512, the gathered and parsed information is logged to an authority collection data file (e.g., the data log 250) or OS control block for each file access request.

Figure 6:
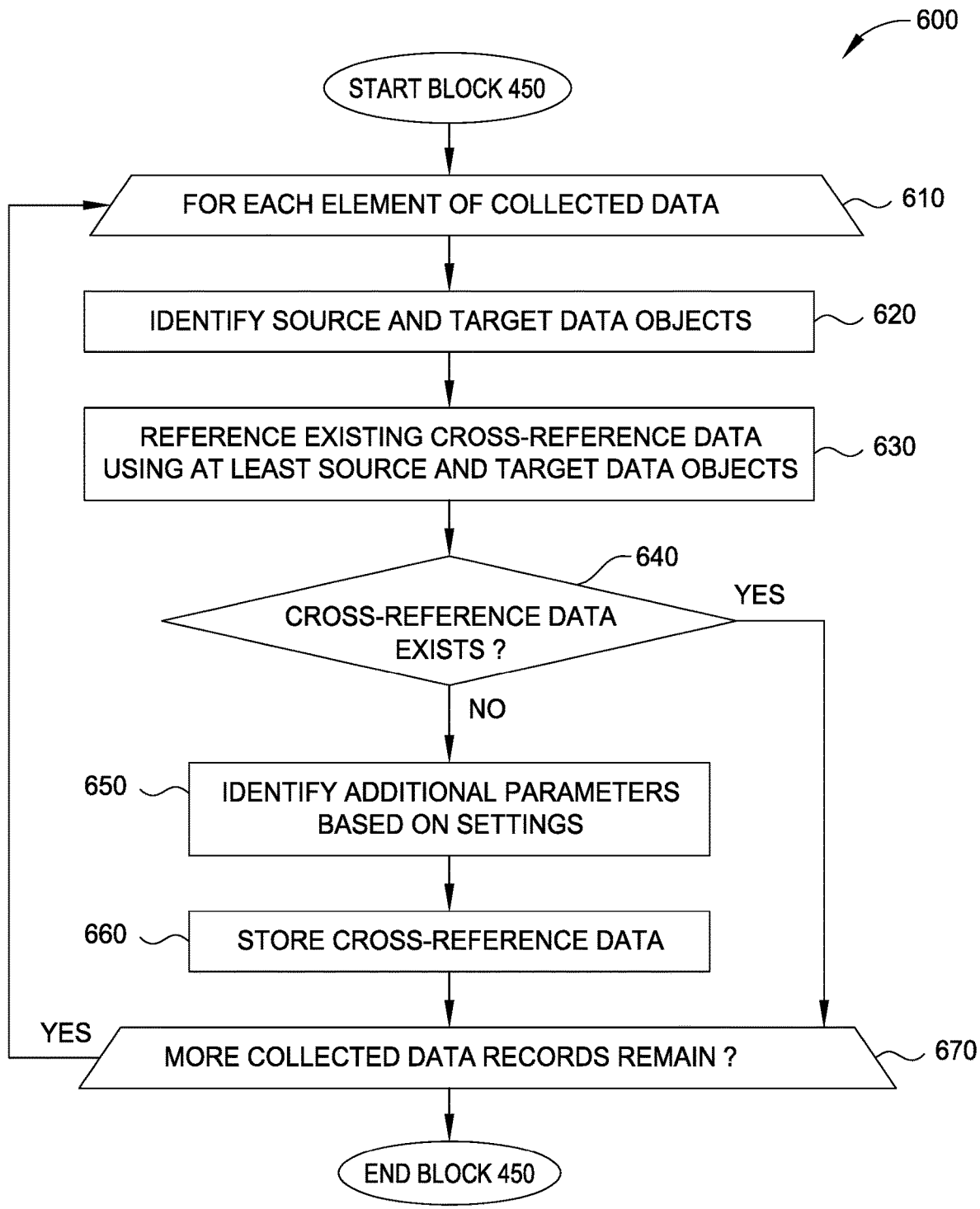
FIG. 6 is a flow chart illustrating an example method to generate comprehensive, system-wide cross-reference data using runtime data collection, according to one embodiment.

FIG. 6 is a flow chart illustrating an example method 600 corresponding to block 450 to generate comprehensive, system-wide cross-reference data using runtime data collection, according to one embodiment. As shown, the method 600 begins at block 610, where the cross-reference module 130 executes a loop including blocks 620-670 for each record of data collected by the authority collection module 224 (e.g., each row of data stored in the data log 250). At block 620, the cross-reference module 130 identifies the source object and the target object for the current record. For example, the source object may be a program, and the target object may be another program, a data file, or any other object in the data files 116. At block 630, the cross-reference module 130 references the cross-reference data 117 using at least the source and target data objects identified at block 620. At block 640, the cross-reference module 130 determines whether a record reflecting a relationship between the source and target data objects already exists in the cross-reference data 117. If a record exists, the cross-reference module 130 proceeds to block 670, as the cross-reference module 130 refrains from adding a duplicate or redundant entry in the cross-reference data 117.

If, however, a record reflecting a relationship between the source and target data objects does not exist in the cross-reference data 117, the cross-reference module 130 proceeds to block 650. At block 650, the cross-reference module 130 identifies additional parameter values collected by the authority collection module 224. The additional parameters may correspond to parameters defined for inclusion in the cross-reference data 117 at block 420 (e.g., statement numbers, detailed permissions information, and the like). At block 660, the cross-reference module 130 stores a record for the current source and target data objects in the cross-reference data 117. At block 670, the cross-reference module 130 determines whether more data records collected by the authority collection module 224 remain. If more records remain (i.e., other accesses to data have been made in the system), the cross-reference module 130 returns to block 610. Otherwise, the method 600 ends.

Advantageously, embodiments disclosed herein provide techniques to provide accurate, system-wide cross-reference data based on runtime data collected during execution of applications and programs on the system. By leveraging environmental data collected by the authority collection module 224, the cross-reference module 130 is able to capture cross-reference information that would otherwise not be included in the cross-reference data 117 (e.g., calls that are made in the source code using variables, rather than actual names).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
receiving a request to access a first file referenced as a variable in a source code of an application;
retrieving a file name of the first file from a runtime stack; and
storing the file name in a system-wide accessible cross-reference file.

2. The method of claim 1, wherein data from the runtime stack includes a program statement number of the application, wherein the program statement number corresponds to an instruction associated with the request, wherein the data from the runtime stack further includes an indication of: (i) a user executing the application, (ii) a most recent program in the runtime stack, (iii) a set of authority permissions required to access the first file, (iv) an actual set of authority permissions the user has to the first file, and (v) an authority source of the actual set of authority permissions the user has to the first file.

3. The method of claim 1, further comprising storing, in the system-wide accessible cross-reference file, (i) the name of the application, (ii) a user executing the application, (iii) a program statement number of the application, (iv) a most recent program in the runtime stack, (v) a set of authority permissions required to access the data file, (vi) a set of authority permissions the user presently has to the data file, and (vii) an authority source of the set of authority permissions the user presently has to the first file.

4. The method of claim 1, further comprising prior to storing the first file name in the system-wide accessible cross-reference file:
referencing the system-wide accessible cross-reference file using at least the name of the application and the name of the first file; and
determining that an entry in the system-wide accessible cross-reference file associating the name of the application and the name of the first file does not exist.

5. The method of claim 1, wherein a background process receives data describing the request and stores an indication that the application accessed the first file in the system-wide accessible cross-reference file.

6. The method of claim 1, further comprising:
receiving, from a second application, a second request to access the first file, wherein the first file is referenced as a variable in a source code of the second application;
receiving data describing the second request from a runtime stack of the second application, wherein the data describing the second request includes a name of the second application and the name of the first file;
referencing the system-wide accessible cross-reference file using at least the name of the second application and the name of the data file;
determining that an entry in the system-wide accessible cross-reference file associating the name of the second application and the name of the data file exists; and
refraining from creating a second entry in the system-wide accessible cross-reference file associating the name of the second application and the name of the data file.

7. The method of claim 1, wherein information from the runtime stack is obtained based on a system object call into an operating system kernel.

8. A computer program product, comprising:
a computer-readable storage medium having computer readable program code embodied therewith, the computer readable program code executable by a processor to perform an operation comprising:
receiving, from an application executing on a system, a request to access a data file, wherein the data file is referenced by a variable name in a source code of the application;
receiving data describing the request, wherein the data describing the request is obtained from a runtime stack of the application and includes a name of the application and a name of the data file, wherein the runtime stack resolves the variable name to the name of the data file; and
storing an indication that the application accessed the data file in a cross-reference data store for the system.

9. The computer program product of claim 8, wherein the data from the runtime stack includes a program statement number of the application, wherein the program statement number corresponds to an instruction associated with the request, wherein the data from the runtime stack further includes an indication of: (i) a user executing the application, (ii) a most recent program in the runtime stack, (iii) a set of authority permissions required to access the data file, (iv) an actual set of authority permissions the user has to the data file, and (v) an authority source of the actual set of authority permissions the user has to the data file.

10. The computer program product of claim 9, wherein the indication that the application accessed the data file stored in the cross-reference data store comprises: (i) the name of the application, (ii) the name of the data file, (iii) the user executing the application, (iv) the program statement number of the application, (v) the most recent program in the runtime stack, (vi) the set of authority permissions required to access the data file, (vii) the actual set of authority permissions the user has to the data file, and (viii) the authority source of the actual set of authority permissions the user has to the data file.

11. The computer program product of claim 8, the operation further comprising prior to storing the indication:
referencing the cross-reference data store using at least the name of the application and the name of the data file; and
determining that an entry in the cross-reference data store associating the name of the application and the name of the data file does not exist.

12. The computer program product of claim 8, wherein a background process receives the data describing the request and stores the indication that the application accessed the data file in the cross-reference data store for the system.

13. The computer program product of claim 8, the operation further comprising:
receiving, from a second application, a second request to access the first data file, wherein the data file is referenced by a variable name in a source code of the second application;
receiving data describing the second request, wherein the data describing the second request is obtained from the runtime stack of the second application and includes a name of the second application and the name of the data file, wherein the name of the data file is used as a value for a variable name;
referencing the cross-reference data store using at least the name of the second application and the name of the data file;
determining that an entry in the cross-reference data store associating the name of the second application and the name of the data file exists; and
refraining from creating a second entry in the cross-reference data store associating the name of the second application and the name of the data file.

14. The computer program product of claim 8, wherein the runtime stack information is obtained based on a system object call into an operating system kernel.

15. A system, comprising:
a processor; and
a memory storing one or more instructions which, when executed by the processor, performs an operation comprising:
receiving, from an application executing on a system, a request to access a data file, wherein the data file is referenced by a variable name in a source code of the application;
receiving data describing the request, wherein the data describing the request is obtained from a runtime stack of the application and includes a name of the application and a name of the data file, wherein the name of the data file is used as a value for the variable name; and storing an indication that the application accessed the data file in a cross-reference data store for the system.

16. The system of claim 15, wherein the data from the runtime stack includes a program statement number of the application, wherein the program statement number corresponds to an instruction associated with the request, wherein the data from the runtime stack further includes an indication of: (i) a user executing the application, (ii) a most recent program in the runtime stack, (iii) a set of authority permissions required to access the data file, (iv) an actual set of authority permissions the user has to the data file, and (v) an authority source of the actual set of authority permissions the user has to the data file.

17. The system of claim 16, wherein the indication that the application accessed the data file stored in the cross-reference data store comprises: (i) the name of the application, (ii) the name of the data file, (iii) the user executing the application, (iv) the program statement number of the application, (v) the most recent program in the runtime stack, (vi) the set of authority permissions required to access the data file, (vii) the actual set of authority permissions the user has to the data file, and (viii) the authority source of the actual set of authority permissions the user has to the data file.

18. The system of claim 15, the operation further comprising prior to storing the indication:
referencing the cross-reference data store using at least the name of the application and the name of the data file; and
determining that an entry in the cross-reference data store associating the name of the application and the name of the data file does not exist.

19. The system of claim 15, wherein a background process receives the data describing the request and stores the indication that the application accessed the data file in the cross-reference data store for the system.

20. The system of claim 15, wherein the runtime stack information is obtained based on a system object call into an operating system kernel, the operation further comprising:
receiving, from a second application, a second request to access the first data file, wherein the data file is referenced by a variable name in a source code of the second application;
receiving data describing the second request, wherein the data describing the second request is obtained from the runtime stack of the second application and includes a name of the second application and the name of the data file, wherein the name of the data file is used as a value for a variable name;
referencing the cross-reference data store using at least the name of the second application and the name of the data file;
determining that an entry in the cross-reference data store associating the name of the second application and the name of the data file exists; and
refraining from creating a second entry in the cross-reference data store associating the name of the second application and the name of the data file.

* * * * *